United States Patent
Gutierrez et al.

[19]

[11] Patent Number: 6,038,871
[45] Date of Patent: Mar. 21, 2000

[54] DUAL MODE CONTROL OF A VARIABLE DISPLACEMENT REFRIGERANT COMPRESSOR

[75] Inventors: Ernesto Jose Gutierrez, Amherst; Charles Andrew Archibald, Lockport; Christopher M. Kachur, Amherst, all of N.Y.; Giles M. Brandon, Bascharage, Luxembourg

[73] Assignee: General Motors Corporation, Detroit, Mich.

[21] Appl. No.: 09/197,963

[22] Filed: Nov. 23, 1998

[51] Int. Cl.⁷ .................................. B60H 1/32; F25B 1/00
[52] U.S. Cl. .......................... 62/133; 62/228.3; 236/78 D
[58] Field of Search .................................. 62/228.3, 133, 62/228.5; 236/78 D

[56] References Cited

U.S. PATENT DOCUMENTS

| | | | |
|---|---|---|---|
| 5,071,321 | 12/1991 | Skinner et al. | 417/270 X |
| 5,088,298 | 2/1992 | Fujii et al. | 62/228.5 |
| 5,145,326 | 9/1992 | Kimura et al. | 417/270 X |

*Primary Examiner*—William Wayner
*Attorney, Agent, or Firm*—Patrick M Griffin

[57] ABSTRACT

An improved control method for an electronically controlled variable displacement refrigerant compressor, where the control has normal and high speed displacement control modes, with smooth transitions between such control modes. The displacement control mechanism is in the form of a solenoid valve, and the valve is pulse-width-modulated (PWM) at a variable duty cycle to regulate displacement of the compressor. When the compressor is operating in a normal speed range, a first control mode determines a normal PWM duty cycle to satisfy cooling demand; when the compressor is operating in a high speed range, a second control mode determines an alternate PWM duty cycle based on compressor speed. The solenoid valve is operated in accordance with the duty cycle corresponding to the lower displacement. A smooth transition from the normal control mode to the high speed control mode is achieved by scheduling the alternate duty cycle as a function of compressor speed. Once in the high speed control mode, the parameters of the first control mode are adjusted so that the normal duty cycle matches the alternate duty cycle. This ensures a smooth transition from the high speed control mode to the normal control mode when the compressor speed falls back into the normal speed range.

10 Claims, 7 Drawing Sheets

DUAL MODE CONTROL OF A VARIABLE DISPLACEMENT REFRIGERANT COMPRESSOR

TECHNICAL FIELD

This invention relates to a control method for an electronically controlled variable displacement refrigerant compressor that is mechanically driven by a motor vehicle engine, where the displacement is controlled in a normal mode or a high speed mode.

BACKGROUND OF THE INVENTION

Variable displacement refrigerant compressors have been utilized in automotive air conditioning systems, with the displacement regulated in accordance with cooling demand via either a hydraulic control valve or solenoid control valve. In a typical arrangement, the compressor includes one or more pistons coupled to a variable angle wobble plate or swash plate, and the control valve adjusts a differential pressure acting on a wobble plate control mechanism to vary the wobble plate angle, and hence the compressor displacement. In the control of such a compressor, it has been found that the compressor durability can be improved without significant loss of cooling during high speed operation of the engine by overriding the normal displacement control and de-stroking the compressor to reduce its displacement to a lower value. By way of example, a hydraulic de-stroking implementation is disclosed in the U.S. Pat. No. 5,071,321, and electronic de-stoking implementations are disclosed in the U.S. Pat. Nos. 4,606,705 and 5,145,326.

A drawback with known controls of the type described above is that the transition between normal and high-speed displacement control modes is abrupt and tends to produce disturbances in the compressor and the engine powertrain. These disturbances are undesired for reasons of both durability and driveability. Accordingly, what is desired is a dual mode control that minimizes disturbances to the compressor and engine powertrain when transitioning from one control mode to the other.

SUMMARY OF THE INVENTION

The present invention is directed to an improved control method for an electronically controlled variable displacement refrigerant compressor, where the control has normal and high speed displacement control modes, with smooth transitions between such control modes.

In a preferred embodiment, the displacement control mechanism is in the form of a solenoid valve, and the valve is pulse-width-modulated (PWM) at a variable duty cycle to regulate a displacement control pressure within the compressor. When the compressor is operating in a normal speed range, a first control determines a normal PWM duty cycle based on cooling demand; when the compressor is operating in a high speed range, a second control determines an alternate PWM duty cycle based on compressor speed. The solenoid valve is operated in accordance with the duty cycle corresponding to the lower displacement.

According to the invention, a smooth transition from normal control to high speed control is achieved by scheduling the alternate duty cycle as a function of compressor speed. Once in the high speed control mode, the parameters of the first control are adjusted so that the normal duty cycle matches the alternate duty cycle. This ensures a smooth transition from high speed operation to normal operation when the compressor speed falls back into the normal speed range.

DESCRIPTION OF THE PREFERRED EMBODIMENT

Figure 1:
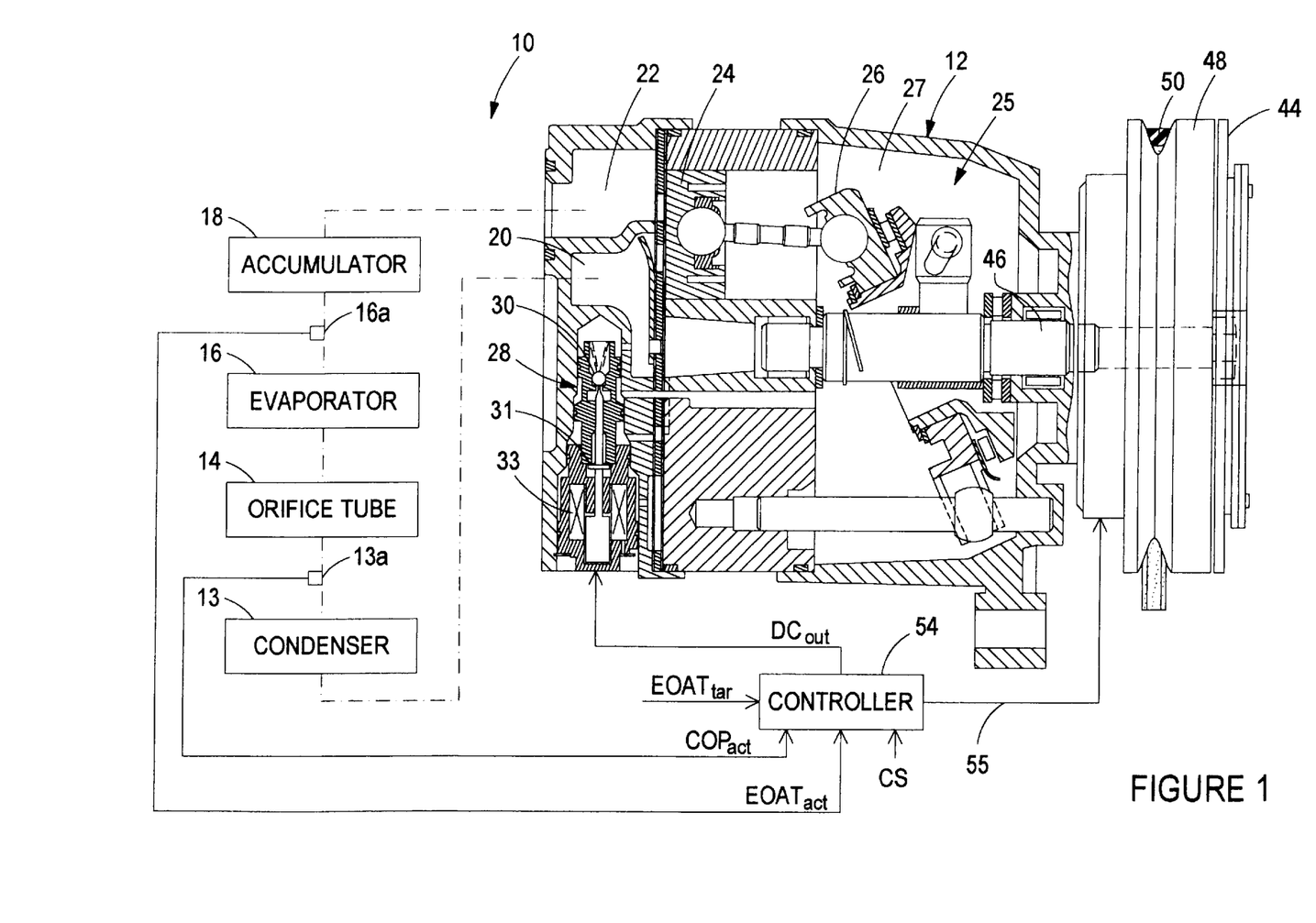
FIG. 1 is a schematic diagram of an automotive air conditioning system including an electronically controlled variable displacement compressor and an electronic controller therefor.

Referring to the drawings, and particularly to FIG. 1, the reference numeral 10 generally designates an automotive air conditioning (AC) system including an electronically controlled multi-cylinder variable displacement refrigerant compressor 12 of the variable angle wobble plate type. The other elements of the system 10 are conventional, and include condenser 13, orifice tube 14, evaporator 16 and accumulator 18 arranged in order between the compressor discharge cavity 20 and suction cavity 22.

A variable speed engine drive shaft (not shown) is coupled to a compressor pulley 48 via drive belt 50, and the pulley 48 is coupled to a compressor drive shaft 46 by an electromagnetic clutch 44. A number of pistons (only one of which is shown in FIG. 1) are mounted in the compressor crankcase 27 so as to be reciprocally driven by the shaft 46 through a tiltable wobble plate mechanism, generally designated by the reference numeral 25. The stroke of the pistons 24, and hence the displacement of the compressor 12, is determined by the operating angle of the wobble plate 26. The wobble plate operating angle is regulated by pulse-width-modulating (PWM) a solenoid actuated control valve 28 to control the pressure in crankcase 27. The control valve 28 includes two valves mechanically coupled to an armature 29: a normally closed ball poppet valve 30 coupling the crankcase 27 to a compressor discharge cavity 20 and a normally open flat poppet valve 31 coupling the crankcase 27 to a compressor suction cavity 22. When the solenoid coil 33 is de-energized, gas pressure in the crankcase 27 bleeds off into suction cavity 22 through poppet valve 31; when coil 33 is energized, high pressure gas enters crankcase 27 from discharge cavity 20 through poppet valve 30. In general, increasing the PWM duty cycle (i.e., the on/off energization ratio of solenoid coil 33) increases the crankcase pressure to decrease the operating angle of the wobble plate 26, and hence the compressor displacement, whereas decreasing the PWM duty cycle decreases the crankcase pressure, thereby increasing the operating angle of wobble plate 26, and hence the compressor displacement.

As described in detail below, the solenoid coil 33 is controllably energized by the electronic controller 54 based on four inputs: a target evaporator outlet air temperature $EOAT_{tar}$, the drive speed CS of compressor 12, the actual outlet pressure $COP_{act}$ of condenser 13, and the actual outlet air temperature $EOAT_{act}$ of evaporator 18. The actual pressure and temperature values $COP_{act}$ and $EOAT_{act}$ may be obtained with suitable conventional transducers 13a, 16a, as indicated. The controller 54 may also be used to control the activation of the compressor clutch 44, as indicated by line 55.

Figure 2:
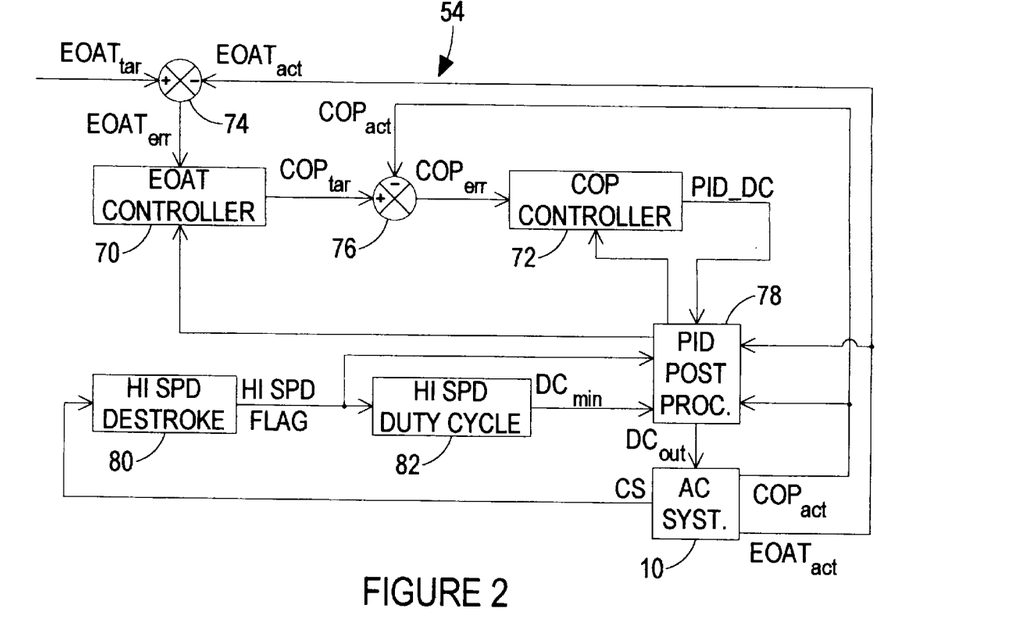
FIG. 2 is a block diagram of the control carried out by the electronic controller of FIG. 1 according to this invention.

FIG. 2 depicts the electronic controller 54 and air conditioning system 10 in block diagram form. A demand device (not shown) sets the target evaporator outlet air temperature $EOAT_{tar}$, and the controller 54 outputs a PWM duty cycle $DC_{out}$ to the AC system 10. As indicated in FIG. 1, transducers in the AC system 10 provide signals indicative of the compressor speed CS, the actual evaporator outlet air temperature $EOAT_{act}$ and the actual condenser outlet pressure $COP_{act}$.

In the preferred embodiment, the normal control comprises two closed loop PID controllers: Evaporator Outlet Air Temperature (EOAT) Controller 70, and Compressor Outlet Pressure (COP) Controller 72. That is, each Controller 70, 72 develops proportional, integral and differential control terms that contribute to the respective output. The input $EOAT_{tar}$ is compared to $EOAT_{act}$ at summing junction 74 to provide an error input $EOAT_{err}$ to EOAT Controller 70, which produces a target compressor outlet pressure $COP_{tar}$. The $COP_{tar}$ signal, in turn, is compared to $COP_{act}$ at summing junction 76 to provide an error input $COP_{err}$ to COP Controller 72, which produces a PWM duty cycle PID_DC. Thus, the EOAT Controller 70 develops a condenser outlet pressure $COP_{tar}$ for eliminating the evaporator outlet temperature error $EOAT_{err}$, and the COP Controller 72 develops a solenoid duty cycle PID_DC (referred to herein as the normal mode duty cycle) for eliminating the compressor pressure error $COP_{err}$. In the preferred digital implementation, both control loops are executed many times per second so that $COP_{tar}$ may be a highly dynamic quantity based upon changes in vehicle speed, system voltage, ambient temperature, or any other disturbance to the AC system 10.

The compressor speed CS is applied as an input to the High Speed Destroke Logic block 80, which controls the status of a high speed indicator, referred to herein as the HIGH SPD flag. When the HIGH SPD flag is set to indicate a high speed condition, the block 82 determines an alternate PWM duty cycle $DC_{min}$ for solenoid valve 56, both the HIGH SPD flag and $DC_{min}$ being applied as inputs to the PID Post Processor 78. The PID Post Processor 78 sets the output duty cycle $DC_{out}$ equal to the higher of normal mode duty cycle PID_DC and alternate duty cycle $DC_{min}$ when the HIGH SPD flag is set so that under high speed operation, the solenoid valve 56 is operated at a low duty cycle to suitably de-stroke, or reduce the displacement of, compressor 12.

During high speed operation, the PID Post Processor 78 additionally determines alternate control parameters for EOAT Controller 70 and COP Controller 72 so that the normal mode duty cycle PID_DC matches the alternate duty cycle $DC_{min}$. In the illustrated embodiment, the EOAT and COP Controllers 70, 72 are PID controllers, and the PID Post Processor 78 determines alternate integral terms for causing $COP_{tar}$ to equal $COP_{act}$, and PID_DC to equal $DC_{min}$. When the compressor speed falls back into the normal speed range, the alternate control parameters are replaced with calculated parameters based on cumulative error, and the integral terms of the EOAT and COP Controllers 70, 72 transition toward values that provide a normal mode duty cycle PID_DC that brings $EOAT_{act}$ into conformance with $EOAT_{tar}$, as described above. This results in a smooth transition from the high speed control mode to the normal control mode, improving the quality of control of the AC system 10.

Figure 3:
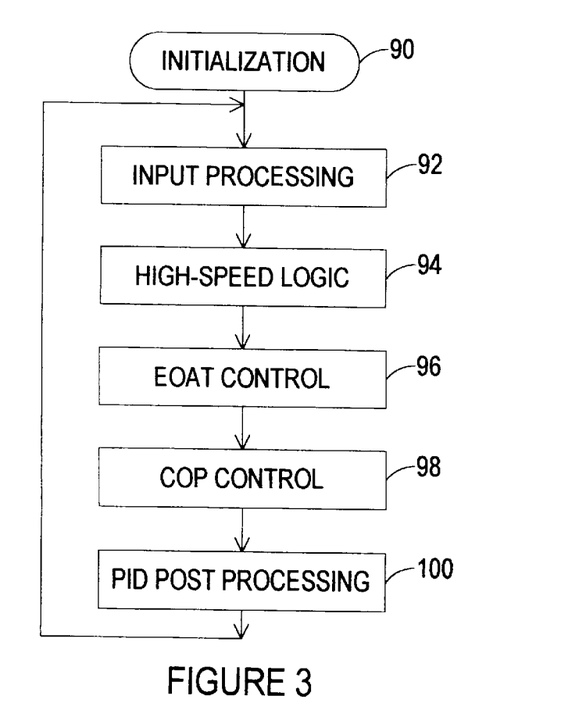
FIG. 3 is a main flow diagram representative of a computer program executed by the controller of FIG. 1 in carrying out the control of this invention.

FIG. 3 is a flow diagram representative of a main loop computer program executed by the controller 54 in carrying out the control of this invention. Block 90 designates a series of initialization instructions for setting various parameters and variables to initial values at the onset of each period of operation of the AC system 10. For example, the cumulative error and integral control terms may be reset to zero. After initialization, the blocks 92–100 are repeatedly executed in sequence to read and process input signals such as CS, $EOAT_{tar}$, $EOAT_{act}$ and $COP_{act}$, to perform the High-Speed Logic, to update the EOAT and COP control loops, and to perform the PID Post Processing function.

The input signal processing designated by block 92 provides a background updating function for the EOAT and COP control loops, computing and storing parameters such as $EOAT_{err}$ and $COP_{err}$, as well as differential error terms $EOAT_{del}$ and $COP_{del}$. The differential error terms $EOAT_{del}$, $COP_{del}$ represent the difference in error terms $EOAT_{err}$, $COP_{err}$, respectively, over a predetermined time interval or execution loop. The EOAT and COP control loops subsequently use these terms to update $COP_{tar}$ and PID_DC, respectively.

Figure 4:
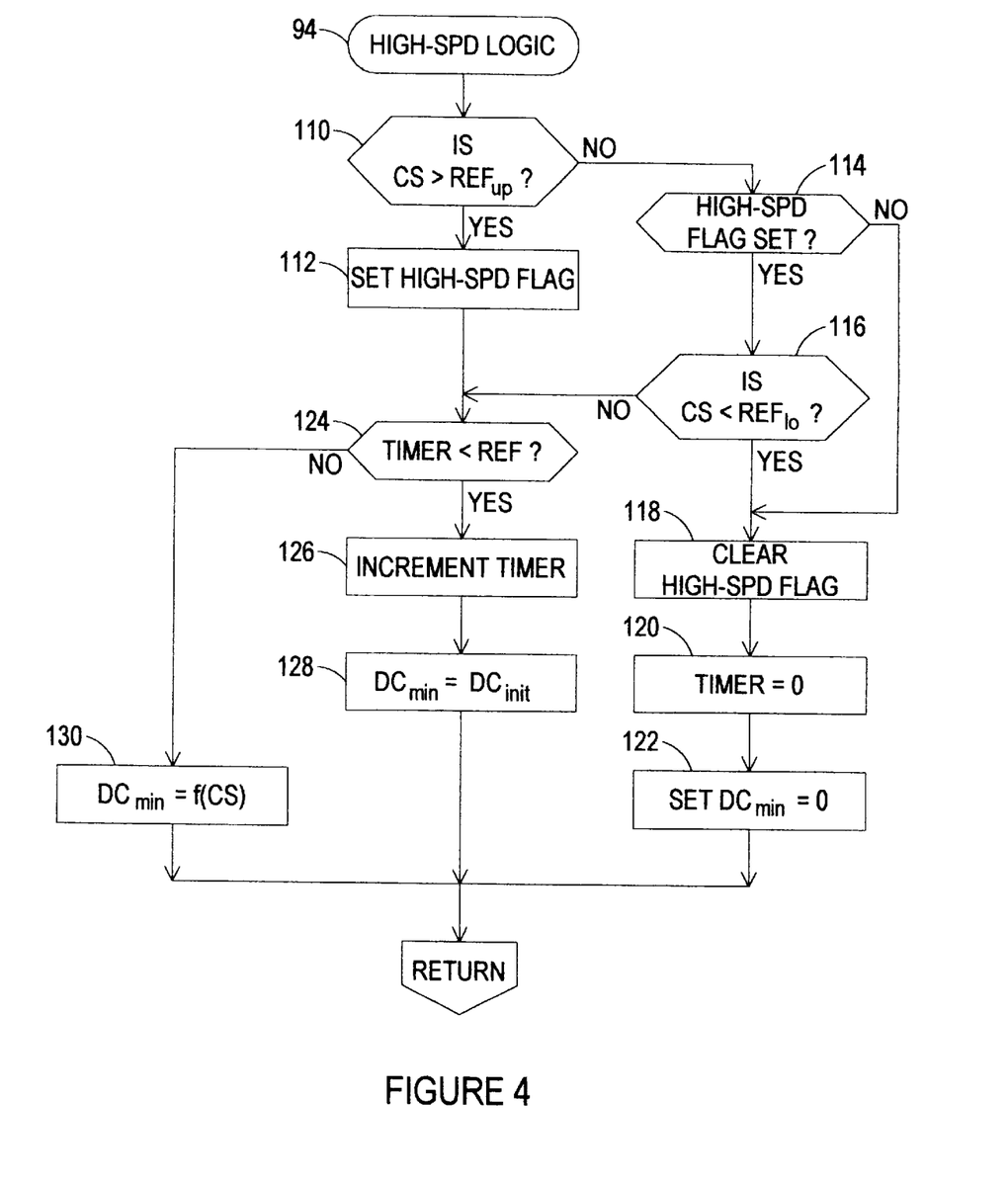
FIG. 4 is a flow diagram detailing a portion of the main flow diagram of FIG. 3 in regard to a high speed logic routine for selecting an alternate solenoid duty cycle.

The High-Speed Logic function of block 94 is described in further detail in the flow diagram of FIG. 4. Referring to FIG. 4, the blocks 110–118 are executed to determine the status of the HIGH SPD flag. The compressor speed CS is compared to an upper reference speed $REF_{up}$ at block 110, and to a lower reference speed $REF_{lo}$ at block 116. If CS exceeds $REF_{up}$, block 112 is executed to set the HIGH SPD flag, indicating a high speed operating condition. Once the HIGH SPD flag is set, as determined at block 114, it remains set until CS falls below $REF_{lo}$. When CS falls below $REF_{lo}$, blocks 118–122 are executed to clear the HIGH SPD flag, to reset a HIGH SPD TIMER to zero, and to set the alternate duty cycle $DC_{min}$ to zero.

Once the HIGH-SPD flag is set, the blocks 124–126 increment the HIGH-SPD TIMER, one count per loop, until the timer count reaches a reference count REF corresponding to a predefined time interval. So long as the timer count is less than REF, the block 128 sets the alternate duty cycle $DC_{min}$ to a predetermined initial value, referred to as $DC_{init}$. Once the timer count reaches REF, the block 130 sets the alternate duty cycle $DC_{min}$ to a value determined as a function of the compressor speed CS. The CS vs. $DC_{min}$ relationship may be determined based on field testing; in general, $DC_{min}$ increases with increasing compressor speed. Alternatively, the HIGH-SPD TIMER may be dispensed with, and $DC_{min}$ may be determined as a function of the compressor speed CS as soon as the HIGH-SPD flag is set.

Figure 5:
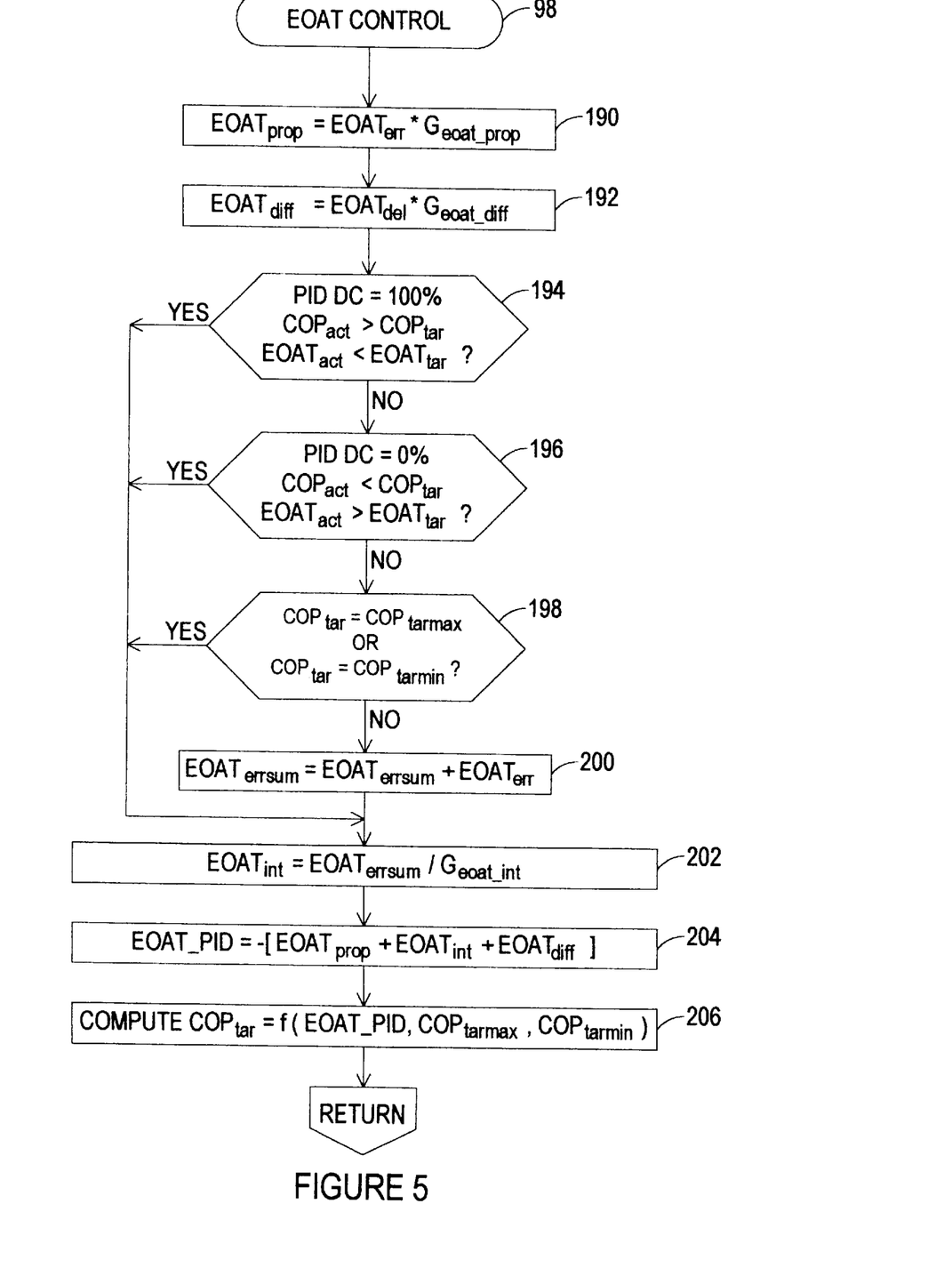
FIG. 5 is a flow diagram detailing a portion of the main flow diagram of FIG. 3 in regard to a PID evaporator outlet air temperature control.

The EOAT Control of main flow diagram block 96 is described in further detail in the flow diagram of FIG. 5. Referring to FIG. 5, the blocks 190–192 are first executed to update the proportional and differential control terms $EOAT_{prop}$ and $EOAT_{diff}$. The proportional control term $EOAT_{prop}$ is determined according to the product of $EOAT_{err}$ and a proportional gain term $G_{eoat\_prop}$, whereas the differential control term $EOAT_{diff}$ is determined according to the product of $EOAT_{del}$ and a differential gain term $G_{eoat\_diff}$. The blocks 194–198 then determine if the EOAT or COP control loops are already at their respective authority limits. Block 194 identifies a minimum compressor displacement condition wherein PID_DC is at 100%, $COP_{act}$ is greater than $COP_{tar}$, and $EOAT_{act}$ is less than $EOAT_{tar}$. Block 196 identifies a maximum compressor displacement condition wherein PID_DC is at 0%, $COP_{act}$ is less than $COP_{tar}$, and $EOAT_{act}$ is greater than $EOAT_{tar}$. Finally, block 200 identifies a COP Control loop limit condition where $COP_{tar}$ is at either a maximum allowable value $COP_{tarmax}$ or a minimum allowable value $COP_{tarmin}$. If none of the limit conditions defined by blocks 194–198 are in effect, the block 200 updates the cumulative error term $EOAT_{errsum}$. If any of the limit conditions defined by blocks 194–198 are in effect, block 200 is skipped, freezing the cumulative error term $EOAT_{errsum}$ at its previous value. The blocks 194–198 thus perform an anti-wind-up function that limits the value of the integral control term $EOAT_{int}$ in a limit condition where the EOAT or COP control loops are already at the limit of their respective authority. The block 202 then computes the integral control term $EOAT_{int}$ based on the cumulative error term $EOAT_{errsum}$ and an integral gain term $G_{eoat\_int}$. The block 204 computes the combined error term EOAT_PID according to the sum of the proportional, differential and integral control terms, and block 206 computes $COP_{tar}$ as a function of EOAT_PID, and the maximum and minimum allowable target condenser outlet pressure values $COP_{tarmax}$ and $COP_{tarmin}$. In general, block 206 scales EOAT_PID such that $COP_{tar}$ is midway between $COP_{tarmax}$ and $COP_{tarmin}$ when EOAT_PID is equal to zero, and such that it increases toward $COP_{tarmax}$ when EOAT_PID is positive, and decreases toward $COP_{tarmin}$ when EOAT_PID is negative.

Figure 6:
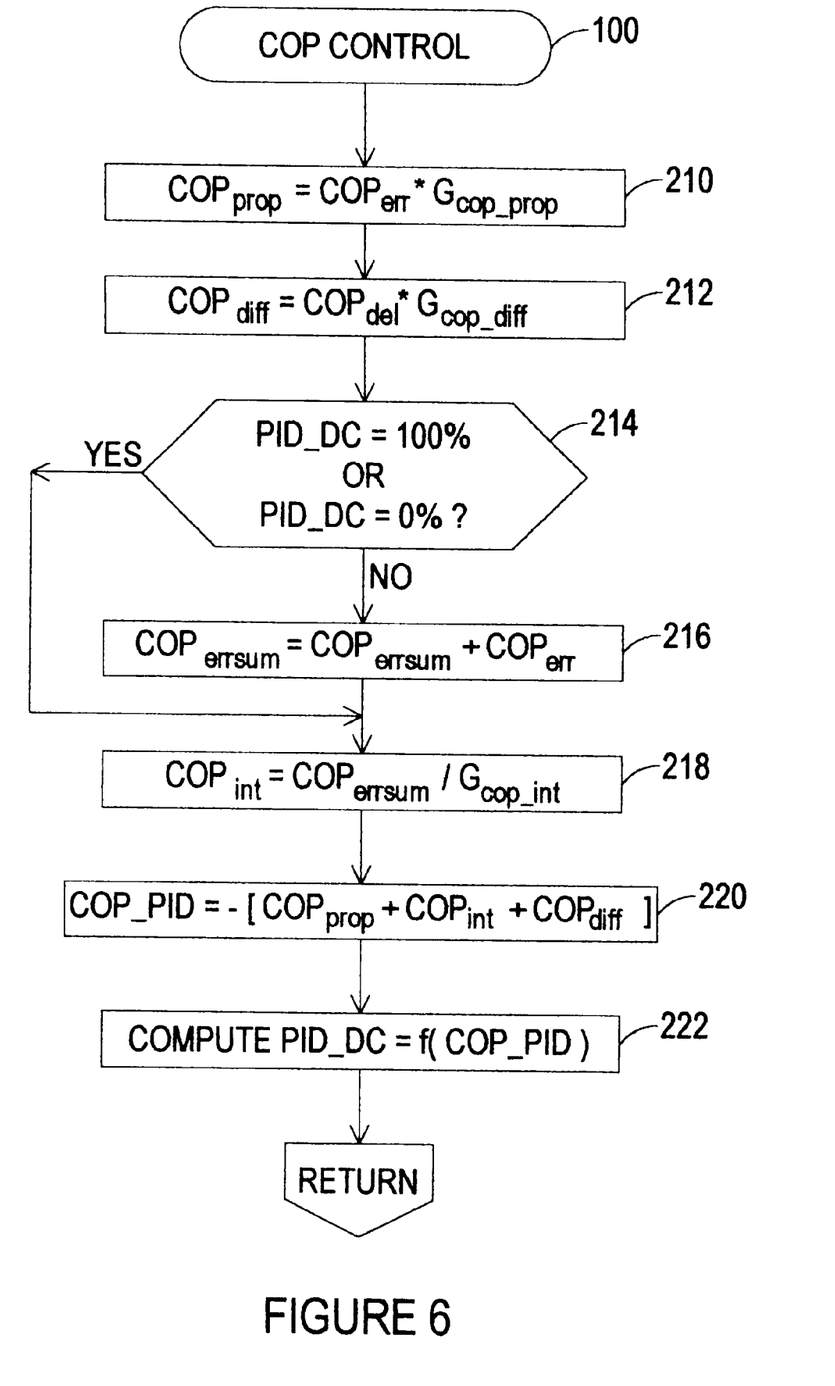
FIG. 6 is a flow diagram detailing a portion of the main flow diagram of FIG. 3 in regard to a condenser outlet pressure control.

The COP Control of main flow diagram block 98 is described in further detail in the flow diagram of FIG. 6. Referring to FIG. 6, the blocks 210–212 are first executed to update the proportional and differential control terms $COP_{prop}$ and $COP_{diff}$. The proportional control term $COP_{prop}$ is determined according to the product of $COP_{err}$ and a proportional gain term $G_{cop\_prop}$, whereas the differential control term $COP_{diff}$ is determined according to the product of $COP_{del}$ and a differential gain term $G_{cop\_diff}$. The block 214 then determines if the COP Control loop is in a limit condition where $COP_{tar}$ is at either the maximum or minimum allowable values $COP_{tarmax}$ or $COP_{tarmin}$. If not, there is no wind-up condition, and the block 216 updates the cumulative error term $COP_{errsum}$. If block 214 is answered in the affirmative, block 216 is skipped, freezing the cumulative error term $COP_{errsum}$ at its previous value. It will be recognized that this mirrors the function performed by blocks 194–198 of the EOAT control of FIG. 5. The block 218 then computes the integral control term $COP_{int}$ based on the cumulative error term $COP_{errsum}$ and an integral gain term $G_{cop\_int}$. The block 220 computes the combined error term COP_PID according to the sum of the proportional, differential and integral control terms, and block 222 scales COP_PID to form the normal duty cycle PID_DC.

Figure 7:
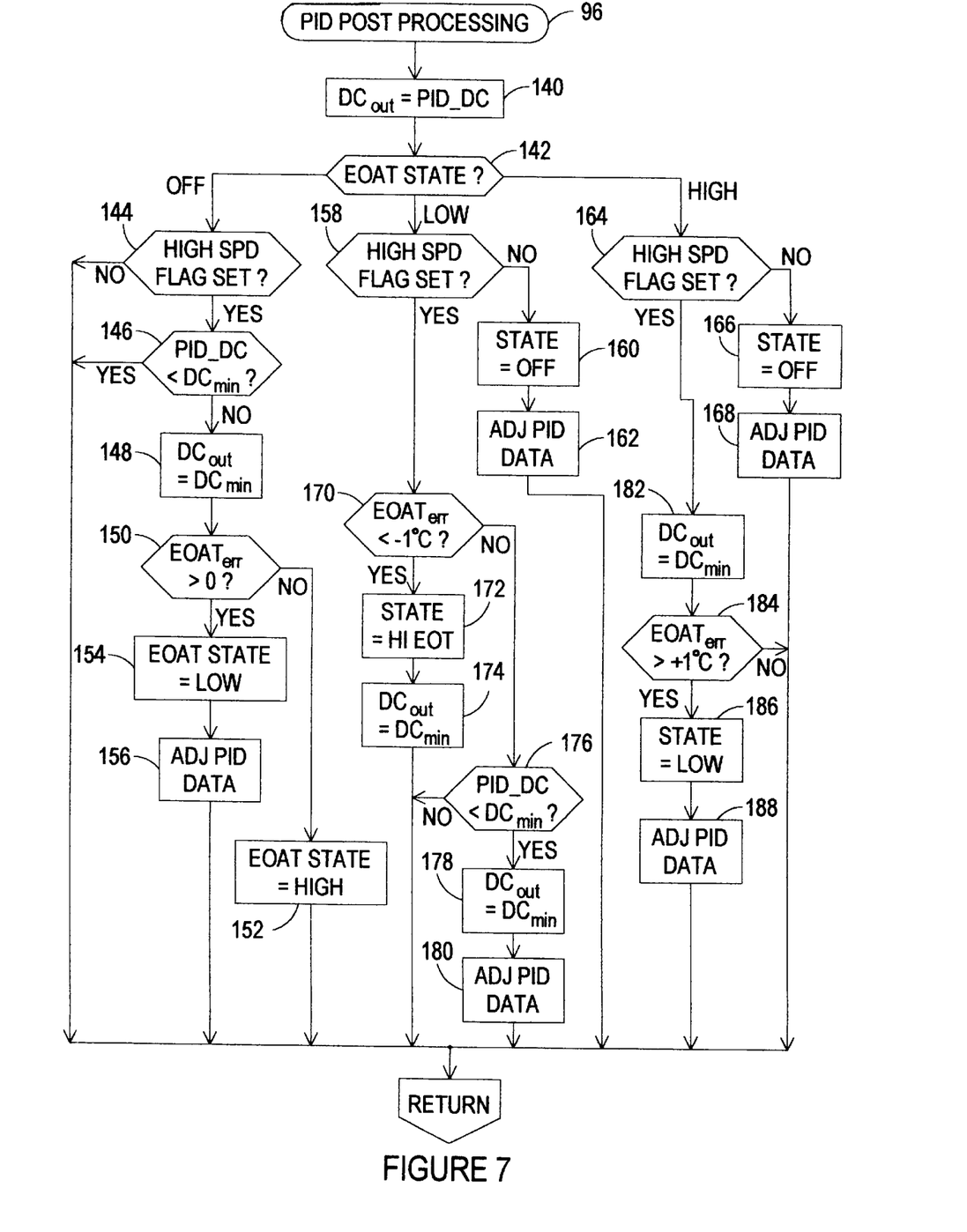
FIG. 7 is a flow diagram detailing a portion of the main flow diagram of FIG. 3 in regard to a PID post processing routine executed during the high speed mode of operation.

The PID Post Processing function of main flow diagram block 100 is described in further detail in the flow diagram of FIG. 7. Referring to FIG. 7, the block 140 initially sets the output duty cycle $DC_{out}$ to the normal duty cycle PID_DC. Block 142 then determines the current EOAT State. The Off State signifies normal mode operation, the Low State signifies high-speed mode operation with $EOAT_{act}$ lower than $EOAT_{tar}$, and the High State signifies high-speed mode operation with $EOAT_{act}$ higher than $EOAT_{tar}$.

Initially, of course, the EOAT State is set equal to Off. If the HIGH-SPD flag is set during the Off State, and the alternate duty cycle $DC_{min}$ is greater than or equal to the normal duty cycle PID_DC, as determined at blocks 142–146, the block 148 sets the output duty cycle $DC_{out}$ equal to the alternate duty cycle $DC_{min}$, and the block 150 determines the polarity of the error term $EOAT_{err}$. If $EOAT_{err}$ is negative, block 152 sets the EOAT State to High. If $EOAT_{err}$ is positive, blocks 154–156 set the EOAT State to Low and adjust the PID data of the EOAT and COP control loops to ensure a smooth transition back to the normal control mode. As explained above, the adjusted PID data serves to modify the EOAT and COP controls so that the normal mode duty cycle PID_DC matches the alternate duty cycle $DC_{min}$. A flow diagram detailing the adjustment of the PID data is described below in reference to FIG. 8.

If the EOAT State is Low, and the HIGH-SPD flag is cleared, as determined at blocks 142 and 158, the blocks 160–162 are executed to set the EOAT State to Off, and to adjust the PID data of the EOAT and COP control loops. Similarly, if the EOAT State is High and the HIGH-SPD flag is cleared, as determined at blocks 142 and 164, the blocks 166–168 are executed to set the EOAT State to Off, and to adjust the PID data of the EOAT and COP control loops.

If the EOAT State is Low, and the HIGH-SPD flag remains set, block 170 is executed to determine if the error term $EOAT_{err}$ is more negative than a reference value such as –1° C. If so, the block 172 sets the EOAT State to High, and the block 174 sets the output duty cycle $DC_{out}$ equal to the alternate duty cycle $DC_{min}$. If the error term $EOAT_{err}$ is less negative than the reference value, and the alternate duty cycle $DC_{min}$ is greater than or equal to the normal duty cycle PID_DC, as determined at blocks 170 and 176, the block 178 sets the output duty cycle $DC_{out}$ equal to the alternate duty cycle $DC_{min}$, and the block 180 adjusts the PID data of the EOAT and COP control loops.

If the EOAT State is High, and the HIGH-SPD flag remains set, block 182 sets the output duty cycle $DC_{out}$ equal to the alternate duty cycle $DC_{min}$, and the block 184 determines if the error term $EOAT_{err}$ is more positive than a reference value such as +1° C. If so, the block 186 sets the EOAT State to Low, and block 188 adjusts the PID data of the EOAT and COP control loops.

In view of the above, it will be understood that the PID Post Processing routine signals adjustment of the PID data of the EOAT and COP control loops whenever the high speed control mode is in effect and $EOAT_{act}$ is lower than the target $EOAT_{tar}$. When $EOAT_{act}$ is higher than the target $EOAT_{tar}$, $DC_{min}$ will be greater than the control loop output PID_DC, and adjustment of the PID data can be suspended. Finally, it will be seen that the PID Post Processing routine signals adjustment of the PID data whenever the HIGH-SPD flag transitions from set to clear.

Figure 8:
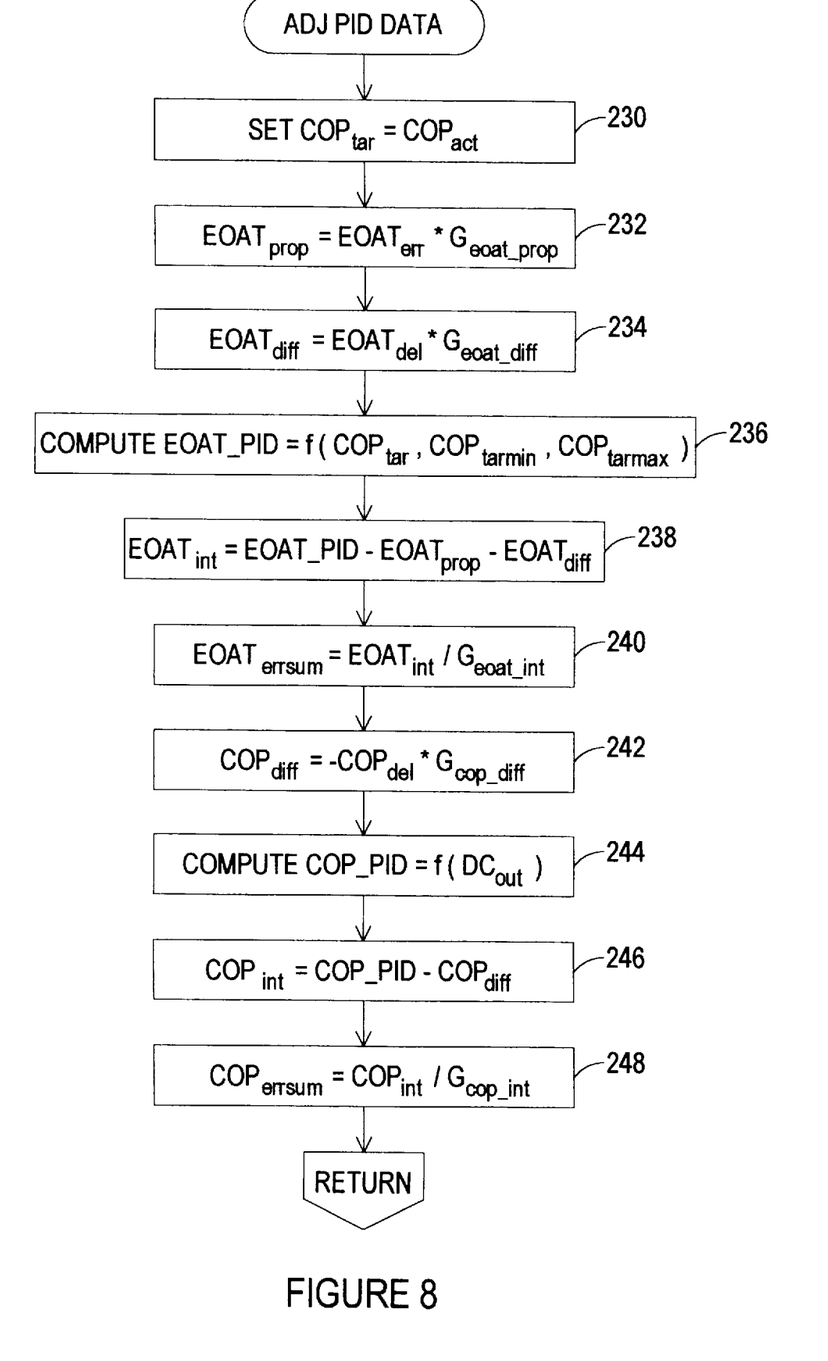
FIG. 8 is a flow diagram detailing a portion of the flow diagram of FIG. 7 in regard to the adjustment of PID data.

Referring to FIG. 8, the adjustment of the PID data as performed by the blocks 156, 162, 180, 168 and 188 of the PID Post Processing flow diagram of FIG. 7 involves (1) setting $COP_{tar}$ equal to $COP_{act}$ (block 230), (2) computing and storing a cumulative error term $EOAT_{errsum}$ that will cause the output of the EOAT control loop, $COP_{tar}$, to be equal to $COP_{act}$ (blocks 232–240), and (3) computing and storing a cumulative error term $COP_{errsum}$ that will cause the normal mode duty cycle PID_DC to be equal to the alternate duty cycle $DC_{min}$ (blocks 242–248). The adjusted error term $EOAT_{errsum}$ is determined by computing the proportional and differential control terms $EOAT_{prop}$ and $EOAT_{diff}$ at blocks 232–234, computing a combined PID term EOAT_PID that would cause $COP_{tar}$ to be equal to $COP_{act}$ at block 236, computing an integral control term $EOAT_{int}$ based on EOAT_PED, EOAT$_{prop}$ and EOAT$_{diff}$ at block 238, and computing the cumulative error term EOAT$_{errsum}$ based on the EOAT$_{int}$ and G$_{eoat\_int}$ at block 240. Similarly, the adjusted error term COP$_{errsum}$ is determined by computing the differential control term COP$_{diff}$ at block 242, computing a combined PID term COP_PID that would cause PID_DC to be equal to DC$_{out}$ at block 244, computing an integral control term COP$_{int}$ based on COP_PID and COP$_{diff}$ at block 246 (COP$_{prop}$ is zero since COP$_{tar}$ is equal to COP$_{act}$), and computing the cumulative error term COP$_{errsum}$ based on the COP$_{int}$ and G$_{cop\_int}$ at block 248.

In summary, the present invention provides an improved dual control method for a variable displacement compressor where transitions between a normal control mode and a high speed control mode occur without causing unnecessary disturbances in the control and powertrain. While the invention has been described in reference to the illustrated embodiment, it is expected that various modifications in addition to those suggested above will occur to those skilled in the art. In this regard, it will be understood that the scope of this invention is not limited to the illustrated embodiment, and that controls incorporating such modifications may fall within the scope of this invention, which is defined by the appended claims.

We claim:

1. A method of operation for an engine driven refrigerant compressor of an automotive air conditioning system, the compressor having a displacement that is controlled in accordance with an electrical displacement control signal developed in response to a cooling demand signal, the method comprising the steps of:

detecting a driven speed of the compressor;

generating a feedback signal indicative of a cooling effect actually produced by said air conditioning system;

developing the displacement control signal in accordance with a first control mode when the detected compressor speed is within a normal speed range, the first control mode being effective to set the displacement control signal at a normal control value selected to bring the feedback signal into correspondence with the cooling demand signal; and developing the displacement control signal in accordance with a second control mode when the detected compressor speed is in a high speed range above said normal speed range, the second control mode being effective to (1) set the displacement control signal at an alternate value based on the detected compressor speed without regard to said cooling demand signal, and (2) modify a control parameter of said first control mode so that said normal control value matches said alternate value.

2. The method of operation of claim 1, wherein the compressor includes a solenoid controlled valve, and said electrical displacement control signal represents a duty cycle of pulse width modulation of said valve.

3. The method of operation of claim 1, wherein the second control mode compares said alternate value to said normal control value, and sets the displacement control signal at the value corresponding to a lower displacement of said compressor.

4. The method of operation of claim 3, wherein the step of modifying a control parameter of said first control mode is suspended when the feedback signal indicates that the cooling effect actually produced is less than the cooling demand.

5. The method of operation of claim 4, wherein the second control mode is effective to modify a control parameter of said first control mode when the compressor speed re-enters said normal speed range.

6. The method of operation of claim 1, wherein:

the step of developing the displacement control signal in accordance with the first control mode includes developing an integral term based on a cumulative error between said feedback signal and said demand signal; and the step of developing the displacement control signal in accordance with the second control mode includes the step of modifying said cumulative error so that said normal control value matches said alternate value.

7. The method of operation of claim 1, wherein:

the step of developing the displacement control signal in accordance with the first control mode includes the steps of determining a refrigerant pressure for bringing the feedback signal into correspondence with the demand signal, and developing a normal control value of said displacement control signal for producing the determined refrigerant pressure; and the step of developing the displacement control signal in accordance with the second control mode includes the step of modifying a first control parameter of said first control mode for bringing the determined refrigerant pressure into correspondence with an actual refrigerant pressure, and modifying a second control parameter of said first control mode for bringing the normal control value into correspondence with said alternate value.

8. The method of operation of claim 7, wherein:

the step of determining the refrigerant pressure in accordance with the first control mode includes developing an integral term based on a first cumulative error between said feedback signal and said demand signal;

the step of developing a normal control value of said displacement control signal in accordance with the first control mode includes developing an integral term based on a second cumulative error between said determined refrigerant pressure and an actual refrigerant pressure; and the step of developing the displacement control signal in accordance with the second control mode includes the step of modifying the first and second cumulative errors for bringing the determined refrigerant pressure into correspondence with the actual refrigerant pressure, and for bringing the normal control value into correspondence with said alternate value.

9. The method of operation of claim 8, wherein the step of modifying the first and second cumulative errors includes the steps of:

determining a first cumulative error that would cause the determined refrigerant pressure to be equal to the actual refrigerant pressure; and determining a second cumulative error that would cause the normal control value to equal the alternate control value.

10. The method of operation of claim 1, wherein the second control mode is effective when the detected compressor speed enters said high speed range to set the displacement control signal to a predetermined initial value, and thereafter to set the displacement control signal at the alternate value based on the detected compressor speed.

* * * * *